(12) United States Patent
Lam et al.

(10) Patent No.: US 10,066,177 B2
(45) Date of Patent: Sep. 4, 2018

(54) DEHYDRATION OF LIQUID FUEL

(71) Applicant: AIRBUS OPERATIONS LIMITED, Bristol (GB)

(72) Inventors: Joseph K-W Lam, Bristol (GB); Craig P. Lawson, Marston Moretaine (GB); Marc Wetterwald, Toulouse (FR)

(73) Assignee: AIRBUS OPERATIONS LIMITED, Bristol (GB)

( * ) Notice: Subject to any disclaimer, the term of this patent is extended or adjusted under 35 U.S.C. 154(b) by 265 days.

(21) Appl. No.: 14/884,839

(22) Filed: Oct. 16, 2015

(65) Prior Publication Data

US 2016/0102261 A1 Apr. 14, 2016

Related U.S. Application Data

(62) Division of application No. 13/184,918, filed on Jul. 18, 2011, now abandoned.

(30) Foreign Application Priority Data

Aug. 3, 2010 (GB) .................................. 1012988.0

(51) Int. Cl.
 *B64D 37/34* (2006.01)
 *C10L 1/08* (2006.01)
(52) U.S. Cl.
 CPC ............... *C10L 1/08* (2013.01); *B64D 37/34* (2013.01); *C10L 2200/043* (2013.01); *C10L 2230/14* (2013.01); *C10L 2270/04* (2013.01); *C10L 2290/08* (2013.01); *C10L 2290/141* (2013.01); *C10L 2290/145* (2013.01); *Y02T 50/44* (2013.01)
(58) Field of Classification Search
 CPC ..... B64D 37/34; C10L 1/08; C10L 2200/043; C10L 2230/14; C10L 2270/04; C10L 2290/08; C10L 2290/141; C10L 2290/145; Y02T 50/44
 USPC .............. 261/121.1, 122.1, DIG. 2, DIG. 83; 244/135 R
 See application file for complete search history.

(56) References Cited

U.S. PATENT DOCUMENTS 2,860,815 A * 11/1958 Finn ....................... C10G 33/06
 137/14
3,693,915 A 9/1972 Ulanovsky
3,732,668 A 5/1973 Nichols
3,788,039 A 1/1974 Bragg
(Continued)

FOREIGN PATENT DOCUMENTS

| GB | 1378276 A | 12/1974 |
|---|---|---|
| GB | 1412964 A | 11/1975 |
| RU | 2094080 C1 | 10/1997 |

OTHER PUBLICATIONS

United Kingdom Search Report for GB1012988.0 dated Nov. 17, 2010.

*Primary Examiner* — Charles Bushey
(74) *Attorney, Agent, or Firm* — Nixon & Vanderhye P.C.

(57) ABSTRACT

A method for dehydrating liquid fuel is disclosed. The method includes injecting a supply of dry gas into a liquid fuel via an outlet submerged in the liquid fuel. Also, a system for dehydrating liquid fuel is disclosed having a container for storing a liquid fuel, a line for delivering a supply of dry gas, and an outlet disposed near the bottom of the container and connected to the gas line for injecting dry gas into the liquid fuel.

21 Claims, 3 Drawing Sheets

(56) References Cited

U.S. PATENT DOCUMENTS

| | | | |
|---|---|---|---|
| 3,792,688 A | | 2/1974 | Grainger |
| 4,809,934 A | | 3/1989 | Rix |
| 5,391,304 A | | 2/1995 | Lantos |
| 5,655,505 A | | 8/1997 | Tusino |
| 6,293,525 B1 | | 9/2001 | Ginsburgh et al. |
| 6,432,169 B1 | * | 8/2002 | Kluwe ................ B01D 53/261 |
| | | | 95/117 |
| 6,526,952 B1 | | 3/2003 | Price |
| 6,830,219 B1 | | 12/2004 | Picot et al. |
| 8,753,429 B2 | | 6/2014 | Lam |
| 2006/0011063 A1 | | 1/2006 | Zhou |
| 2008/0187785 A1 | | 8/2008 | Kwok |
| 2008/0199376 A1 | | 8/2008 | Limaye et al. |
| 2009/0293848 A1 | * | 12/2009 | Raymo, Sr. ........ F02M 25/0854 |
| | | | 123/518 |
| 2009/0302163 A1 | | 12/2009 | Sanford |
| 2010/0021360 A1 | | 1/2010 | Leenders et al. |
| 2011/0068231 A1 | | 3/2011 | Surawski |
| 2012/0103192 A1 | * | 5/2012 | Lam ...................... B64D 37/10 |
| | | | 95/91 |

\* cited by examiner

DEHYDRATION OF LIQUID FUEL

RELATED APPLICATIONS

The present application is a divisional application of U.S. application Ser. No. 13/184,918, filed Jul. 18, 2011, now abandoned, which claims priority from Great Britain Application Number 1012988.0, filed Aug. 3, 2010, all of which are hereby incorporated herein by reference in their entirety.

FIELD OF THE INVENTION

The present invention relates to a system and method for dehydrating liquid fuel.

BACKGROUND OF THE INVENTION

Water is an unavoidable contaminant in fuel. Water can affect components in fuel systems and lead to operational delays and increased maintenance activities. In addition, the propensity for microbiological contamination is directly proportional to the presence of water and the temperature within fuel tanks.

Although water may affect fuel systems of land or water based vehicles, water is a particular problem in aircraft fuel systems. Water may enter aircraft fuel tanks from fuel loaded into the aircraft fuel tanks during refuel (dissolved water) and from air entering the aircraft fuel tanks via its vent system. A vent system to ambient air is normally required to normalise the pressure within the fuel tanks during climb and descent of the aircraft.

Dissolved water poses little problem to fuel systems reliability and function so long as it remains dissolved in fuel. However, since the solubility of water in fuel decreases with decreasing temperature, during cruise water from dissolution (rejection of dissolved water from fuel) can form droplets of the order of microns suspended within the fuel. These water droplets settle slowly to the bottom of the tank. In addition, natural convection currents bring the saturated fuel into contact with cold tank surfaces where water from dissolution causes condensation on cold surfaces. The condensation tends to run down the walls of the fuel tank and collect as free water pools in the bottom of the tank.

Pooled free water can be drained off when the aircraft is on the ground but this is time consuming and costly, leading to a loss of operational efficiency. At sufficiently cold temperatures the free water can freeze, which can require a further significant maintenance operation of heating the aircraft in a hangar in order to perform the water drain activity. After safety, one of the most important criteria in aircraft design is the aircraft operational cost. Aircraft operational cost can be significantly impacted by its maintenance requirement and water contamination within fuel tanks is a maintenance burden, which this invention seeks to reduce.

SUMMARY OF THE INVENTION

A first aspect of the invention provides a method for dehydrating liquid fuel, the method comprising injecting a supply of dry gas into a liquid fuel via an outlet submerged in the liquid fuel.

A further aspect of the invention provides a system for dehydrating liquid fuel, the system comprising a container for storing a liquid fuel, a line for delivering a supply of dry gas, and an outlet disposed near the bottom of the container and connected to the gas line for injecting dry gas into the liquid fuel.

The invention is advantageous in that the dry gas injected into the fuel forms bubbles, which rise through the fuel, and diffusion of water from the fuel into the gas occurs until equilibrium is reached. By reducing the concentration of dissolved water in the fuel, there is a reduction in the amount of water that can precipitate out of the fuel due to, e.g. a decrease in fuel temperature.

The term "dry gas" as used here refers to any gas having a water (vapour) content lower than the water content of the fuel. The gas is relatively drier than the fuel.

The rate of diffusion is dependent on several factors, including temperature and the interfacial area between the fuel and the gas.

The gas is therefore preferably supplied "warm", i.e. at a temperature of between approximately 30 degrees Celsius to approximately 40 degrees Celsius. The gas temperature is most preferably around 35 degrees Celsius. The gas may be supplied at a temperature higher than that of the fuel. The gas temperature may be dependent on the fuel type. Accordingly, the gas temperature may be supplied at a temperature higher or lower than the range stated above. For example, the gas temperature may be in the range of from approximately 0 to 5, 5 to 10, 10 to 15, 15 to 20, 20 to 25, 25 to 30, 30 to 35, or 35 to 40 degrees Celsius, or any combination of these ranges.

The interfacial area between the fuel and the gas may be increased by adapting the outlet to form fine gas bubbles, e.g. having a diameter less than approximately 1-2 mm. However, the gas bubbles may have a greater diameter, if desired. In particular, it may be desirable to form gas bubbles of greater diameter so as to increase the gas flow rate in order to achieve a desirable pressure in the ullage of the container (e.g. a fuel tank). This may be an over-pressure relative to the ambient so there is a net flow out of the ullage towards the ambient. Alternatively, this may be an equilibrium pressure with the ambient so there is no net flow. Accordingly, the outlet preferably has a variable aperture for forming gas bubbles of different sizes.

The liquid fuel may be a hydrocarbon fuel. The liquid fuel may be an aviation fuel. In particular, the fuel may be a civil aviation fuel such as Jet A-1.

The gas may be an inert gas. In this context, "inert" means that the gas is functionally inert with respect to the fuel to prevent unwarranted combustion occurring. The gas therefore preferably has a low oxygen content. The gas may be nitrogen, preferably having a purity of approximately 98% or more. Alternatively, the gas may be nitrogen enriched air, preferably having a nitrogen content of between approximately 90% to approximately 98%. Alternatively, the dry gas may be oxygen depleted air, preferably having an oxygen content of between approximately 0% to approximately 12%.

The container may be a fuel tank. The invention may be employed on-board a vehicle, or at a fixed fuel storage location. The dry gas may be supplied from a storage tank. Alternatively, in the case where the invention is employed on-board a vehicle, the dry gas may be generated on-board the vehicle. The on-board gas generator may include a drier for drying the gas. The on-board gas generator may include a fuel cell, and/or a catalyst, and/or a gas separation membrane.

In a preferred implementation of this invention, the dry gas is generated on-board an aircraft and used to dehydrate aviation fuel in an aircraft fuel tank. The gas generated may be a product of another aircraft system. For example, a power generating fuel cell may output oxygen-depleted air, which after drying can be used to dehydrate the aviation fuel used to power the main aircraft engines.

The dry gas used to dehydrate the fuel may be additionally used to provide an inert atmosphere in the ullage above the fuel in the container.

In a preferred implementation, an on-board inert gas generating system (OBIGGS) may be used both to dehydrate the fuel and to inert the ullage.

One known OBIGGS uses engine bleed air passed through a hollow-fibre, permeable membrane, or air separation module, to selectively remove the oxygen and generates a dry nitrogen-enriched air, which is used to displace the fuel-air mixture in the ullage. According to one example of this invention, the dry nitrogen-enriched air generated by the OBIGGS may be injected into the fuel thereby dehydrating the fuel and then forming the inert ullage atmosphere as the gas bubbles burst at the surface of the fuel.

Another known "Green" OBIGGS (or GOBIGGS) uses the fuel-air mixture from the ullage and passes this over a catalyst that combusts the fuel-air mixture into an oxygen-depleted inert gas that is recycled back into the fuel tank. However, the inert gas has a relatively high moisture content as a by-product of the combustion. According to one example of this invention, the inert gas from the catalytic reaction can be dried using a drier and the dry gas injected into the fuel thereby dehydrating the fuel and then forming the inert ullage atmosphere as the gas bubbles burst at the surface of the fuel.

Since the fuel level, and pressure, within a fuel tank is subject to change, a vent system is typically employed that vents the fuel tank ullage to the ambient atmosphere in order to equalise pressure between the interior and the exterior of the fuel tank. When there is a net inflow of air through the vent system into the fuel tank ullage, unwanted moisture may enter the fuel system. In the case of an aircraft fuel tank, this can be a particular issue during descent when there is typically a net inflow of humid air into the tank, which could cause unwarranted condensation on cold surfaces within the fuel tank. This invention may also be used to address this issue by injecting an sufficient volume flow rate of the dry gas into the fuel such that there is a minimal, zero, or negative net inflow of air through the fuel tank vent system. The system may therefore include a "high" flow mode. In addition to reducing the water content within the fuel tank, the high flow of inert gas may be used to ensure there is an inert atmosphere within the fuel tank ullage. It may be preferable to have a net outflow from the ullage to ambient to vent the moisture in the fuel picked up by the dry gas to the ambient. This is to ensure the water is removed from the system.

Since the concentration of water within the fuel will reduce owing to operation of this invention, the concentration of water within the fuel is likely to be highest at the start of injecting the dry gas into the fuel. The rate of water diffusion from the fuel into the gas may therefore be highest at the start of operations, which could lead to a temporary increase in the relative humidity in the fuel tank ullage. This may be undesirable as condensation may form on the fuel tank walls. To combat this, the rate of gas flow injected into the fuel may be controlled so as to increase slowly at start-up. In addition, it may be operated in a high flow mode such that there is a net outflow from ullage to ambient to drive out the moisture from the system.

Injection of a flow of dry gas directly into the ullage may be used simultaneously with the injection of dry gas into the fuel so as to prevent the relative humidity in the ullage atmosphere from becoming saturated. The two dry gas streams may be from separate sources, and the make up of the gas streams may differ.

Alternatively, the two dry gas streams may be from the same source, in which case a single dry gas stream may be split in two.

Yet further alternatively, an ullage air conditioning system may be used to dry the ullage atmosphere.

Any waste water from any part of this system may be collected, drained, or otherwise stored for disposal or treatment. The water may be mixed with the fuel at a suitably low concentration to be safely fed to a combustion engine, where the water may be removed as the fuel is combusted.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
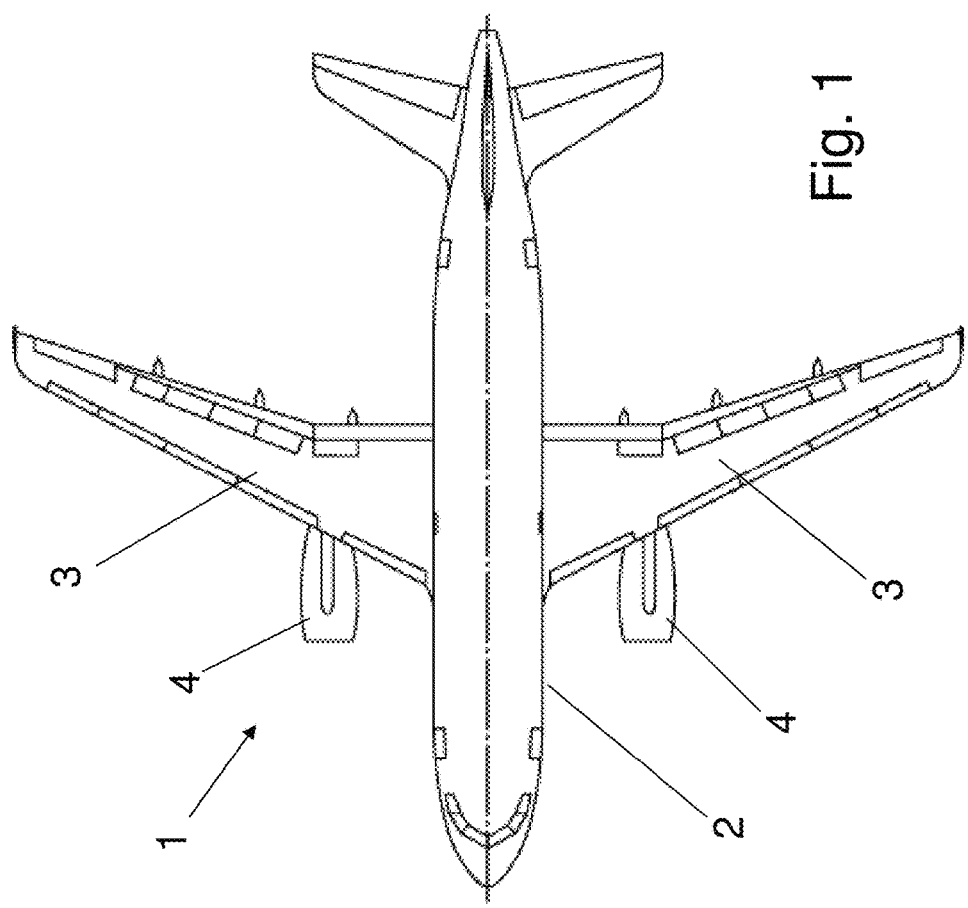
FIG. 1 illustrates schematically an aircraft wing having three fuel tanks.

FIG. 1 illustrates a plan view of an aircraft 1, such as a commercial airliner, comprising a fuselage 2, a wing 3 and under wing mounted engines 4. The interior volume of the wing 3 is used as fuel tanks for storing liquid hydrocarbon aviation fuel, such as Jet A-1. The aircraft 1 has a three tank configuration, which forms part of an aircraft fuel system.

Figure 2:
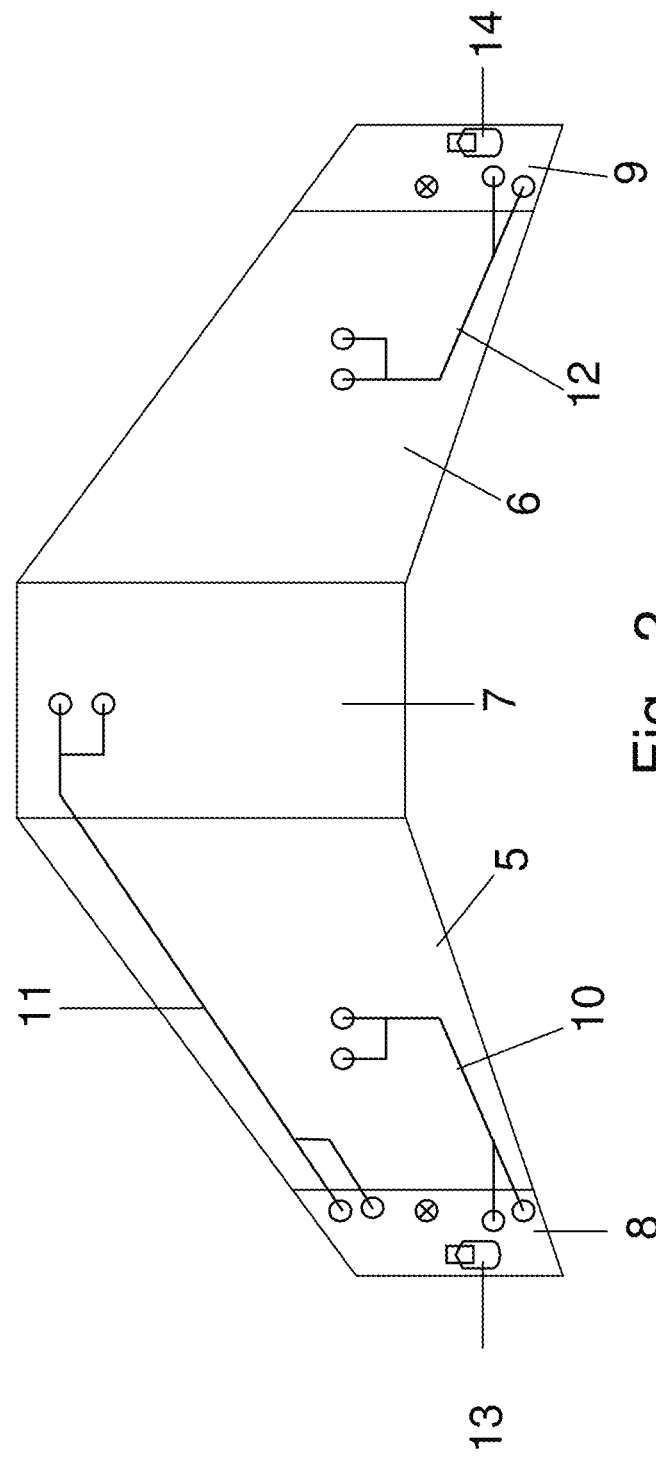
FIG. 2 illustrates schematically a system for dehydrating fuel in the fuel tank using dry, inert gas generated on-board the aircraft.

FIG. 2 illustrates schematically the three tank configuration which comprises a left wing tank 5, a right wing tank 6 and a centre tank 7. The aircraft fuel system further comprises a ventilation system for ventilating the ullage of each of the fuel tanks 5, 6, 7. The ventilation system includes a left vent tank 8 and a right vent tank 9 disposed at the tips of the wing 3. The vent tank 8 ventilates the left wing tank 5 by means of ventilation pipe 10, and also ventilates the centre tank 7 by means of ventilation pipe 11. The right vent tank 9 ventilates the right wing tank 6 by means of ventilation pipe 12. Each vent tank 8, 9 includes a NACA duct assembly 13, 14 including a NACA vent, or NACA scoop, which opens to the ambient atmosphere on the lower aerodynamic surface of the aircraft wing 3.

Figure 3:
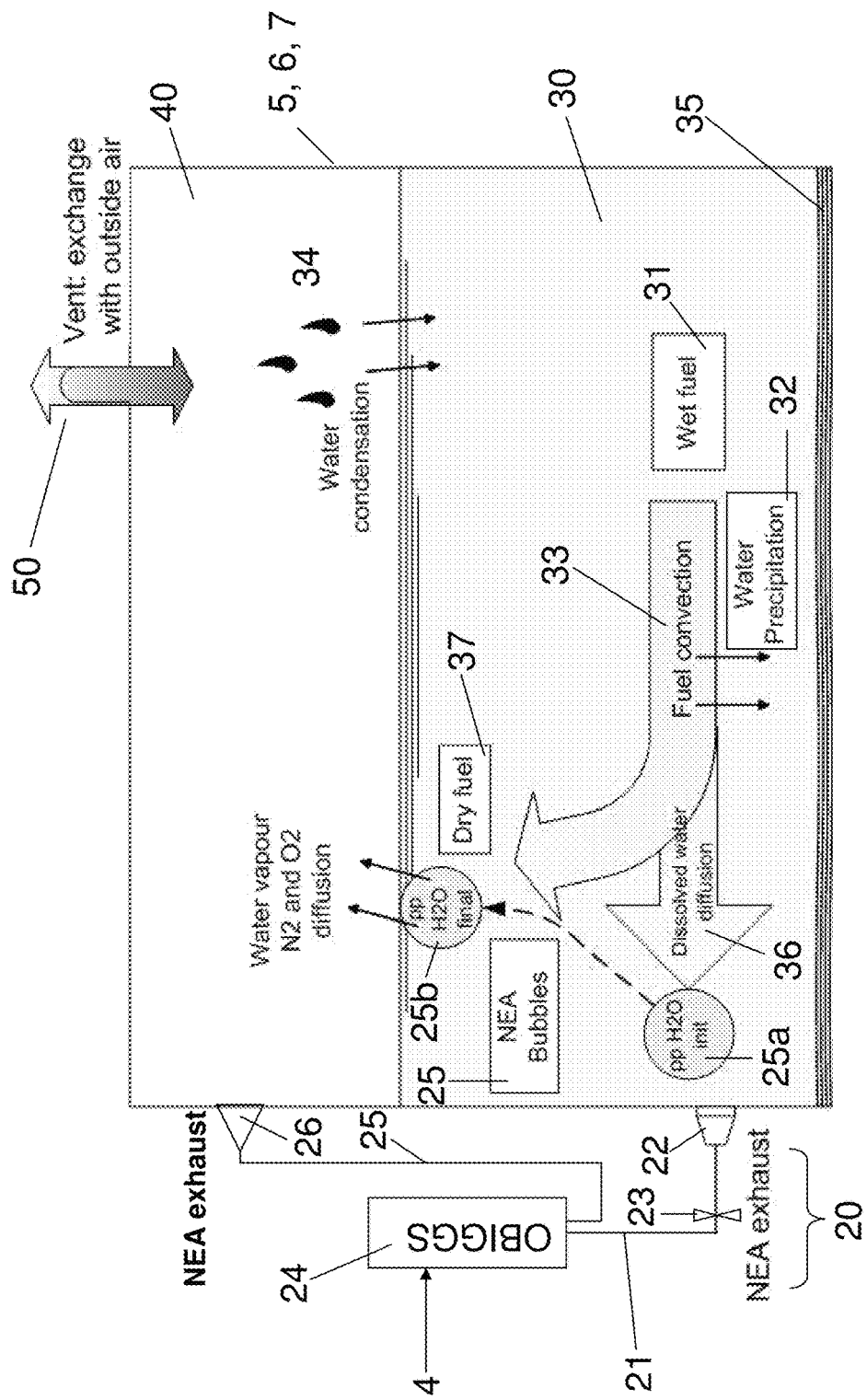
FIG. 3 illustrates schematically a dehydration system for dehydrating fuel within fuel tanks.

FIG. 3 illustrates schematically a dehydration system 20 for dehydrating fuel 30 within the fuel tanks 5, 6, 7. Water as unavoidable contaminant in fuel. Water may be present within fuel systems in a variety of forms. When the aircraft 1 is refueled, the fuel 30 which enters the fuel tanks 5, 6, 7 includes a controlled amount of free water but an uncontrolled amount of dissolved water. The amount of dissolved water is dependent on the environment. However, since the solubility of water in fuel decreases with decreasing temperature, during ascent and cruise the fuel 30 can become saturated, forming so called "wet fuel" 31. As this wet fuel 31 is cooled further, water from dissolution (rejection of dissolved water from fuel) forms droplets of water precipitation 32 of the order of microns, which are suspended within the fuel. These water droplets settle slowly to the bottom of the tank 5, 6, 7.

In addition, convection currents 33 bring the saturated wet fuel 31 into contact with cold tank surfaces where water from dissolution causes condensation 34 on cold tank surfaces. The condensation tends to run down the walls of the fuel tank 5, 6, 7 and collect as free water pools 35 in the bottom of the tank. Whilst this pooled free water 35 can be drained off when the aircraft is on the ground, the present invention resides in a dehydration system 20 for dehydrating the fuel 30 so as to minimise the amount of pooled free water 35 within the fuel tanks 5, 6, 7. This reduces the time and cost of aircraft water maintenance activities, leading to an improvement in operational efficiency.

The dehydration system comprises a line 21 for delivering a supply of dry gas, and an outlet 22 disposed near the bottom of the fuel tank 5, 6, 7 which is connected to the line 21 for injecting dry gas into the fuel 30. A valve 23 is provided on the line 21 for controlling the gas flow rate through the outlet 22. The outlet 22 has an aperture adapted to form gas bubbles of a predetermined dimension. The outlet aperture is variable for forming gas bubbles of a variety of different diameters. The line 21 is connected to an onboard inert gas generating system (OBIGGS) 24. The OBIGGS 24 uses bleed air from the aircraft engines 4 and passes this through a hollow fibre, permeable membrane, or air separation module, to selectively remove the oxygen and generate dry nitrogen enriched air (NEA). The NEA is the dry gas used in the dehydration system 20.

The fundamental principles of using the NEA exhaust from the OBIGGS 24 to dry the fuel 30 will now be described in detail with reference to FIG. 3. When the dehydration system 20 is operated the OBIGGS 24 delivers a supply of NEA exhaust along line 21 to the submerged outlet 22. Induced convection currents 33 within the fuel tanks 5, 6, 7 bring wet fuel 31 into contact with NEA bubbles 25 being injected into the fuel from the submerged outlet 22. Since the NEA bubbles 25 are initially dry, whilst the wet fuel 31 is relatively wetter with dissolved water, dissolved water diffusion 36 occurs from the wet fuel 31 into the initially dry NEA bubbles 25a adjacent to the outlet 22. As the NEA bubbles 25 rise through the fuel 30 in the fuel tanks 5, 6, 7 water diffusion from the fuel 30 into the NEA bubbles is expected until both environments reach equilibrium. As the NEA bubbles 25b reach the surface of the fuel 30 they will contain their final, highest concentration of water vapour. The rising gas bubbles induce the convection currents 33.

The wetter NEA bubbles 25b burst at the interface between the fuel 30 and the ullage 40 of the fuel tanks 5, 6, 7. As the NEA bubbles 25b burst, nitrogen, water vapour and a low concentration of oxygen is released into the ullage atmosphere. In this way, the concentration of water within the fuel 30 is gradually decreased, leaving relatively dry fuel 37 near the top of the fuel volume. This relatively dry fuel 37 will become wetter by diffusion of dissolved water from the surrounding fuel and carried by the induced fuel convection current 33 until the now wet fuel 31 once again comes into contact with the NEA bubbles 25. The overall fuel volume 30 therefore becomes relatively drier, as a result of release of water vapour into the ullage atmosphere 40, and so water in suspension and any free water in pools 35 at the bottom of the tank will begin to re-dissolve into the fuel 30.

Of course, it is not sufficient simply to move the water from the fuel 30 into the ullage 40 as water condensation 34 will start to form at the fuel surface and at the exposed cold tank surfaces. However, as described previously, the fuel tanks 5, 6, 7 include a vent system generally indicated by numeral 50 in FIG. 3, which includes the vent tanks 8, 9, the NACA duct assemblies 13, 14 and the vent lines 10, 11, 12 described above with reference to FIG. 2. The vent system 50 can be operated to vent the saturated ullage atmosphere 40 to ambient, thereby permanently removing water from the fuel tanks 5, 6, 7. Alternative variants of the vent system 50 will be described in further detail later.

The process of dissolved water diffusion from the wet fuel 31 into the NEA bubbles 25 is slow and is dependent upon the interfacial area between the fuel and the gas bubbles 25. This interfacial area is maximised by creating particularly fine NEA bubbles 25 at the outlet 22. The fine gas bubbles may have a diameter less than approximately 1-2 mm, for example. The outlet 22 may take the form of a piccolo tube, for example. Whilst the formation of fine NEA bubbles 25 is effective in increasing the interfacial area and consequently the diffusion rate of water from the wet fuel 31 into the NEA bubbles 25, it is desirable that the volume flow rate of gas being injected from the outlet 22 into the fuel 30 can be switched to a high flow mode for reasons that will now be explained.

During ascent, the decreasing ambient atmospheric pressure causes a net outflow from the fuel tank ullage 40 through the vent system 50 to ambient. Operating the dehydration system 20 during ascent of the aircraft causes permanent removal of some of the water from the fuel tank 5, 6, 7 as it is released by the NEA bubbles 25 and carried out of the fuel tank 5, 6, 7 with the net outflow of ullage atmosphere through the vent system 50.

During cruise, when the aircraft 1 is at a relatively constant altitude with little variation in ambient pressure, consumption of the fuel 30 by the aircraft engines 4 causes a net increase in the volume of the ullage 40. For a conventionally ventilated ullage 40, there will be a net inflow of ambient air through the vent system 50 into the expanding ullage volume. However, by operating the dehydration system 20 during the cruise there will be either a minimal, zero, or negative net inflow of air through the vent system 50. If the flow rate through the outlet 22 is low then there may be a minimal net inflow of ambient air into the ullage 40. If there is a moderate flow rate through the outlet 22 then there may be zero net inflow of ambient air through the vent system 50 into the ullage 40. If there is a relatively high flow rate through the outlet 22 then there may be a negative net inflow (i.e. outflow) through the vent system 50 such that the ullage 40 is continuously venting to ambient through the vent system 50 during the cruise. By reducing or eliminating the net inflow of ambient air through the vent system 50 into the ullage 40 it is possible to create and maintain an inert ullage atmosphere 40.

Investigations have shown that by reducing the oxygen content of the ullage atmosphere 40 to below around 12% renders the ullage atmosphere inert. Since the NEA exhaust generated by OBIGGS 24 has a nitrogen content of between approximately 90% to approximately 98% it is evident that as the NEA bubbles 25 burst at the fuel surface, displacement of the ullage atmosphere occurs, which over time creates an inert ullage atmosphere 40.

During descent, as the aircraft 1 descends to a lower altitude where the ambient pressure is higher there would ordinarily be a net inflow of ambient air through the vent system 50 into the ullage 40. This is undesirable for several reasons. Firstly, the water content of the ambient air at lower altitudes is much higher than that at higher altitudes and so moist ambient air is brought into the ullage, reversing the water removal process carried out during the cruise. Secondly, a net inflow of ambient air during descent would reintroduce a relatively high level of oxygen into the ullage atmosphere, reversing the inerting process carried out during the cruise. Thirdly, since the aircraft may have been operating at cruise altitude for some time when the descent phase begins, the surfaces of the fuel tanks 5, 6, 7 may be cold such that ingress humid ambient air readily condenses on these cold tank surfaces forming beads of water which run down to the bottom of the fuel tank 5, 6, 7 and form free water pools. The free water is unlikely to re-dissolve since the volume of fuel 30 remaining within the tanks 5, 6, 7 is likely to be low as the aircraft 1 draws near to completion of its flight. As mentioned previously, free water pools are undesirable in aircraft fuel systems as they increase the requirement for costly and time consuming water maintenance activities on the aircraft, and so reduce operational efficiency.

To combat these issues, the dehydration system 20 can be operated in a high flow mode whereby the volume flow rate of NEA gas exhaust generated by the OBIGGS 24, and injected into the fuel tank 5, 6, 7 from the outlet 22, is high. The volume flow rate may be sufficiently high to cause a minimal, zero, or negative net inflow of ambient air through the vent system 50 into the fuel tank ullage 40. By reducing or eliminating the net inflow of moist ambient air through the vent system 50 into the fuel tank ullage 40 during descent it becomes possible to maintain an inert ullage atmosphere and to significantly reduce or prevent the introduction of water into the fuel tank 5, 6, 7 from the ambient air. The high flow mode may include operating the OBIGGS 24 at maximum, opening the valve 23 fully, and setting the aperture of the outlet 22 to maximum. The outlet 22 may not be fully or even partially submerged within the fuel 30 when the system 20 is operated in the high flow mode but this is not an issue as the fuel 30 will likely be sufficiently dry by the end of the cruise phase of the flight and the primary objective of the high flow mode is to significantly reduce, or prevent, the conditions under which there may be a significant net inflow of ambient air into the fuel tank ullage 40 through the vent system 50.

Returning to FIG. 3, it can be seen that the dehydration system 20 further includes a second line 25 for delivering a supply of dry gas, and a second outlet 26 disposed near the top of the fuel tank 5, 6, 7 which is connected to the line 25 for injecting dry gas directly into the ullage 40. That is to say, the outlet 26 is disposed above the fuel level within the tank 5, 6, 7. The purpose of the second outlet 26 is to inject a supply of dry gas generated by OBIGGS 24 into the ullage 40 so as to displace the water vapour laden ullage atmosphere that will be created as the fuel 30 is dried by the NEA bubbles 25. The NEA exhaust from OBIGGS 24 through outlet 26, together with the NEA exhaust through the outlet 22, drives a net outflow of the ullage atmosphere to vent through the vent system 50. The outlet 26 may be used to inject a low/medium flow rate of NEA exhaust into ullage 40 particularly at early phase of cruise, so as to prevent the relative humidity in the ullage atmosphere from becoming saturated. If the relative humidity in the ullage atmosphere were allowed to reach saturation (i.e. 100%), water would be condensed on cold surfaces and thereby not removed from the system.

Whilst in FIG. 3 the line 25 is connected to OBIGGS 24, it will be appreciated that in an alternative embodiment line 25 may be connected to a separate source of dry inert gas.

It will also be apparent to those skilled in the art that other sources of dry inert gas, other than OBIGGS 24, may be used. For example, the inert gas may be nitrogen, preferably having a purity of approximately 98% or more. Alternatively, the dry gas may be oxygen depleted air, preferably having an oxygen content of between approximately 0% to approximately 12%. The inert gas also need not be generated on board the aircraft, as in the case of the OBIGGS 24. Instead, the dry gas may be supplied from a storage tank, such as a pressurised gas cylinder, for example. For weight saving, however, it is preferable that the dry inert gas is generated on board the aircraft.

Alternative on board inert gas generation systems include a "Green" OBIGGS (or GOBIGGS) which extracts the fuel-air mixture from the fuel tank ullage and passes this over a catalyst that combusts the fuel-air mixture into an oxygen-depleted inert gas. The inert gas may have a relatively high moisture content as a by-product and so the inert gas from the catalytic reaction would need to be dried using a drier. The inert gas can be used in the same manner as described previously in the embodiment with reference to FIG. 3.

In a further alternative embodiment the dry gas may be generated on board the aircraft as a by-product of an electrical energy generating system. For example, a fuel cell may output oxygen depleted air, which after drying can be used as an inert gas to dehydrate the fuel in the tank and may also be used to vent the fuel tank ullage.

It will also be appreciated that whilst the above described embodiments are embodied in an aircraft fuel system, the alternative embodiments of the invention may be employed in land or water based vehicles, or in static fuel storage tanks, for example. In the case of a static fuel storage tank, it is envisaged that the principals of this invention may be used to dehydrate the fuel in the tank to below a predetermined maximum concentration of dissolved water.

Although the invention has been described above with reference to one or more preferred embodiments, it will be appreciated that various changes or modifications may be made without departing from the scope of the invention as defined in the appended claims.

The invention claimed is:

1. A method for dehydrating liquid fuel stored in a container, the method comprising injecting a supply of dry gas into a liquid fuel via an outlet disposed near the bottom of the container and submerged in the liquid fuel, the dry gas having a water vapour content lower than a water content of the liquid fuel, the dry gas exiting the outlet forming bubbles which rise through the fuel and diffusion of water from the fuel into the gas occurs until equilibrium is reached, and the container having a vent to ambient atmosphere external to the container through which fuel tank ullage displaced by introduction of the dry gas passes, the method further comprising varying an aperture of the outlet.

2. A method according to claim 1, wherein the liquid fuel is a hydrocarbon fuel.

3. A method according to claim 1, wherein the liquid fuel is an aviation fuel.

4. A method according to claim 1, wherein the dry gas is inert.

5. A method according to claim 1, wherein the dry gas is nitrogen.

6. A method according to claim 1, wherein the dry gas is nitrogen enriched air.

7. A method according to claim 1, wherein the dry gas is oxygen depleted air.

8. A method according to claim 1, further comprising injecting a second supply of dry gas directly into the container ullage.

9. A method for dehydrating liquid aviation fuel on-board an aircraft, the method comprising injecting a supply of dry gas into an aircraft fuel tank via a submerged outlet using the method of claim 1.

10. A method according to claim 9, further comprising generating the dry gas on-board the aircraft.

11. A method according to claim 10, wherein generating the dry gas on-board the aircraft utilises a fuel cell.

12. A method according to claim 10, wherein generating the dry gas on-board the aircraft utilizes a catalyst.

13. A method according to claim 10, wherein generating the dry gas on-board the aircraft utilises a gas separation membrane.

14. A method according to claim 9, further comprising injecting a second supply of dry gas directly into the fuel tank ullage.

15. A method according to claim 1, further comprising varying the gas flow rate through the outlet.

16. A method according to claim 1, further comprising drying a gas to form the supply of dry gas.

17. A method according to claim 5, wherein the nitrogen has a purity of approximately 98% or more.

18. A method according to claim 6, wherein the nitrogen enriched air has a nitrogen content of between approximately 90% to approximately 98%.

19. A method according to claim 1, wherein the dry gas is oxygen depleted air having an oxygen content of between approximately 0% to approximately 12%.

20. A method for dehydrating liquid fuel stored in a container, the method comprising injecting a supply of dry gas into a liquid fuel via an outlet disposed near the bottom of the container and submerged in the liquid fuel, the dry gas having a water vapour content lower than a water content of the liquid fuel, the dry gas exiting the outlet forming bubbles which rise through the fuel and diffusion of water from the fuel into the gas occurs until equilibrium is reached, and the container having a vent to ambient atmosphere external to the container through which fuel tank ullage displaced by introduction of the dry gas passes, wherein the dry gas is supplied at a temperature of between approximately 30 degrees Celsius to approximately 40 degrees Celsius.

21. A method for dehydrating liquid fuel stored in a container, the method comprising injecting a supply of dry gas into a liquid fuel via an outlet disposed near the bottom of the container and submerged in the liquid fuel, the dry gas having a water vapour content lower than a water content of the liquid fuel, the dry gas exiting the outlet forming bubbles which rise through the fuel and diffusion of water from the fuel into the gas occurs until equilibrium is reached, and the container having a vent to ambient atmosphere external to the container through which fuel tank ullage displaced by introduction of the dry gas passes, wherein the dry gas is supplied at a temperature around 35 degrees Celsius.

* * * * *